(12) United States Patent
Kwon

(10) Patent No.: US 10,189,092 B2
(45) Date of Patent: Jan. 29, 2019

(54) MACHINE TOOL

(71) Applicant: DOOSAN MACHINE TOOLS CO., LTD., Changwon-si, Gyeongsangnam-do (KR)

(72) Inventor: Tae Hyeong Kwon, Changwon-si (KR)

(73) Assignee: DOOSAN MACHINE TOOLS CO., LTD., Changwon-si, Gyeongsangnam-do (KR)

(*) Notice: Subject to any disclaimer, the term of this patent is extended or adjusted under 35 U.S.C. 154(b) by 0 days.

(21) Appl. No.: 15/550,216

(22) PCT Filed: Feb. 5, 2016

(86) PCT No.: PCT/KR2016/001281
§ 371 (c)(1),
(2) Date: Aug. 10, 2017

(87) PCT Pub. No.: WO2016/129884
PCT Pub. Date: Aug. 18, 2016

(65) Prior Publication Data
US 2018/0029136 A1 Feb. 1, 2018

(30) Foreign Application Priority Data

Feb. 10, 2015 (KR) .................. 10-2015-0020324

(51) Int. Cl.
B23B 29/24 (2006.01)
B23Q 5/04 (2006.01)
(Continued)

(52) U.S. Cl.
CPC ............ *B23B 29/244* (2013.01); *B23B 29/24* (2013.01); *B23B 29/32* (2013.01); *B23B 29/323* (2013.01);
(Continued)

(58) Field of Classification Search
CPC ............ Y10T 82/2587; Y10T 29/5112; B23Q 1/0063–1/009; B23B 29/24–29/34
(Continued)

(56) References Cited

U.S. PATENT DOCUMENTS 3,589,213 A 6/1971 Gourley
5,007,314 A * 4/1991 Hafla ...................... B23B 3/161
82/120
(Continued)

FOREIGN PATENT DOCUMENTS

CN 201227753 Y 4/2009
CN 104096869 A 10/2014
(Continued)

OTHER PUBLICATIONS

Machine Translation EP 0074452 A1, which EP '452 was published Mar. 1983.*
(Continued)

*Primary Examiner* — Erica E Cadugan
(74) *Attorney, Agent, or Firm* — Hauptman Ham, LLP

(57) ABSTRACT

The present invention relates to a machine tool including a ram spindle and a tool holder, and provides a machine tool comprising: a tool holder including at least two inserts; and a ram spindle capable of fixing the tool holder in a clamped state or rotating the tool holder in order to change the position of the insert, such that the position of the insert can be quickly changed, thereby enabling an improvement in productivity and precision and a reduction in product costs.

14 Claims, 5 Drawing Sheets

(51) Int. Cl.
  *B23Q 3/155* (2006.01)
  *B23Q 3/157* (2006.01)
  *B23Q 3/12* (2006.01)
  *B23Q 1/00* (2006.01)
  *B23B 29/32* (2006.01)
  *B23B 3/10* (2006.01)

(52) U.S. Cl.
  CPC ............. *B23Q 1/0063* (2013.01); *B23Q 3/12* (2013.01); *B23Q 3/155* (2013.01); *B23Q 3/1556* (2013.01); *B23Q 5/04* (2013.01); *B23B 3/10* (2013.01); *Y10T 29/50* (2015.01); *Y10T 29/5112* (2015.01); *Y10T 82/2511* (2015.01); *Y10T 82/2587* (2015.01); *Y10T 409/309408* (2015.01); *Y10T 483/115* (2015.01); *Y10T 483/1705* (2015.01); *Y10T 483/1707* (2015.01)

(58) Field of Classification Search
  USPC .................... 82/159; 29/27 A; 407/30–63
  See application file for complete search history.

(56) References Cited

U.S. PATENT DOCUMENTS

| | | | | |
|---|---|---|---|---|
| 5,027,682 | A * | 7/1991 | Aiso | ................... B23Q 1/0063 409/144 |
| 7,021,182 | B2 * | 4/2006 | Edler | ................... B23B 29/242 407/99 |
| 7,506,423 | B2 * | 3/2009 | Iwabuchi | ................ B23B 3/065 29/27 C |
| 2002/0170396 | A1 * | 11/2002 | Maier | ................... B23B 3/164 82/1.11 |
| 2003/0129024 | A1 * | 7/2003 | Hansson | .............. B23B 29/242 403/374.3 |
| 2004/0177491 | A1 * | 9/2004 | Pinger | ................... B23B 29/242 29/566 |
| 2006/0104728 | A1 * | 5/2006 | Erickson | ............... B23B 29/242 407/46 |
| 2008/0178447 | A1 | 7/2008 | Okada et al. | |
| 2011/0052342 | A1 * | 3/2011 | Hongou | .................. B23B 29/04 409/231 |
| 2011/0182679 | A1 * | 7/2011 | Bierl | ..................... B23B 31/026 407/53 |

FOREIGN PATENT DOCUMENTS

| | | | |
|---|---|---|---|
| EP | 0074452 | A1 * | 3/1983 |
| GB | 1274711 | A | 5/1972 |
| JP | 10-015715 | A * | 1/1998 |
| KR | 10-2010-0071162 | A | 6/2010 |
| KR | 10-2011-0071264 | A | 6/2011 |
| KR | 10-2012-0117647 | A | 10/2012 |
| KR | 10-2013-0067638 | A | 6/2013 |
| KR | 10-2013-0086716 | A | 8/2013 |
| KR | 10-2014-0070743 | A | 6/2014 |
| KR | 10-2014-0072350 | A | 6/2014 |

OTHER PUBLICATIONS

International Search Report for PCT/KR2016/001281 dated Apr. 19, 2016.
Chinese Office Action dated Jul. 31, 2018, in connection with the Chinese Patent Application No. 201680009331.9.
Extended European Search Report dated Oct. 9, 2018, corresponding to European Application No. 16749424.4.
Korean Office Action dated Jul. 18, 2018, in connection with the Korean Patent Application No. 10-2017-7024956.

* cited by examiner

<Prior Art>

<Prior Art>

MACHINE TOOL

CROSS-REFERENCE TO RELATED APPLICATION

This present application is a national stage filing under 35 U.S.C § 371 of PCT application number PCT/KR2016/001281 filed on Feb. 5, 2016 which is based upon and claims the benefit of priority to Korean Patent Application No. 10-2015-0020324 filed on Feb. 10, 2015 in the Korean Intellectual Property Office. The disclosures of the above-listed applications are hereby incorporated by reference herein in their entirety.

FIELD OF DISCLOSURE

The present invention relates to a machine tool which includes a ram spindle and a tool holder having improved structures, respectively.

BACKGROUND OF THE DISCLOSURE

Machine tools refer to machines used for the purpose of machining metallic or non-metallic workpieces (hereinafter referred to as the "base materials") into desired shapes and dimensions by means of appropriate tools by using various types of cutting or non-cutting methods.

Furthermore, machine tools may be basically classified into turning centers configured to machine base materials by rotating the base materials and moving tools and machining centers configured to machine base materials by rotating tools and moving the base materials.

FIG. 1 is a view showing a machine tool in which a conventional ram spindle is disposed, and FIG. 2 is a perspective view showing the conventional ram spindle and a conventional tool holder which are coupled to each other.

Referring to FIG. 1, in a conventional machine tool 10, a turntable 2 is disposed, an auto tool changer (ATC) accommodated in an ATC accommodation part 6 and a column 8 are disposed on a base 1, a cross rail 9 is disposed on the column 8, and a ram carriage 5 is disposed on a side of the cross rail 9.

A base material (not shown) to be machined is fastened to and rotated on the turntable 2, and the ram carriage 5 is movable in a direction parallel to a ground surface by means of the cross rail 9.

In this case, the ram carriage 5 is movable along a vertical transfer part 7 in a direction perpendicular to a ground surface. A ram spindle 4 is disposed at the distal end of the ram carriage 5, and a head block 3 is disposed at the free end of the ram spindle 4.

In other words, the ram spindle 4 disposed on the ram carriage 5 is moved along the cross rail 9 in the x-axis direction and along the vertical transfer part 7 in the z-axis direction, and is thus disposed at a location where a tool can machine the rotating base material through turning.

In this case, a tool holder 20 having a mounting depression 21 into which an insert (a tool) for machining a rotating base material is disposed may be mounted on the head block 3. The tool holder 20 is mounted in or detached and replaced from the ATC inside the ATC accommodation part 6 depending on the machining path and shape of a base material.

However, the method of replacing the tool holder 20 of the conventional machine tool 10 requires a long replacement time, and increases the number of required tool holders 20, thereby increasing the costs of the machine tool 10.

Furthermore, the individual tool holders 20 have minute differences, and thus a problem with the reliability of the degree of precision may occur due to the differences in machining distance attributable to inserts mounted into the tool holders 20.

SUMMARY

The present invention has been conceived to overcome the above-described problems, and an object of the present invention is to provide a machine tool which includes a plurality of inserts, thereby reducing tool holder replacement time, performing rapid and precise machining, and increasing productivity and cost competitiveness.

In order to accomplish the above object, the present invention provides a machine tool having a ram spindle and a tool holder, the machine tool including: a tool holder configured to include at least two inserts; and a ram spindle configured to fasten the tool holder in the state of clamping the tool holder and to rotate the tool holder in order to change the locations of the inserts.

The ram spindle may include: a housing configured to have an open surface in the lower side surface thereof; a center part rotatably accommodated inside the housing; a first outer part disposed outside the center part, and configured to be co-rotated with the center part; a second outer part disposed between the housing and the first outer part, and fastened to the housing; and an actuator unit accommodated inside the housing, and configured to be selectively movable upward and downward through the open surfaces of the center part and the first outer part.

The tool holder may include: a coupling part configured such that one end thereof is mounted on the ram spindle; and a mounting part configured such that at least two inserts are coupled to the free end thereof, and disposed on the other end of the coupling part.

Outer ribs protruding at equal intervals may be formed on the outer circumferential surface of the first outer part, a cavity may be formed in the other end of the coupling part, and inner ribs protruding to come into contact with an inner diameter of the first outer part or to be spaced apart at predetermined intervals may be formed on the inner circumferential surface of the cavity at equal intervals.

The outer diameter of one end of the coupling part defined by the cavity may be formed to be equal to that of the second outer part, and the inner diameter of the one end of the coupling part may be formed to be equal to or larger than that of the second outer part.

One or more protrusions may be formed on the first outer part; and depressions configured to be seated over the protrusions may be formed in the coupling part so as to correspond in number to the protrusions.

The protrusions may be formed adjacent to the outer ribs; and the depressions may be formed adjacent to the inner ribs.

A first protrusion and depression part and a second protrusion and depression part configured to be engaged with each other may be formed on the opposite surfaces of the second outer part and the coupling part, respectively, and may be engaged with each other when the center part and the first outer part are raised by the actuator unit.

At least two protruding keys may be disposed on the outer circumferential surface of the center part; and key coupling depressions configured to be engaged with the keys may be formed on the first outer part.

A guide protrusion formed to protrude may be disposed at the center of the cavity; and a guide depression corresponding to the guide protrusion may be formed in the center part.

The actuator unit may be disposed inside the center part or first outer part.

The actuator unit may include: a clamping passage configured to raise the center part; an unclamping passage spaced apart from the clamping passage, and configured to lower the center part; and a spring configured to provide restoring force in the direction in which the center part is raised.

The machine tool may further include an auto tool changer (ATC) configured to store the tool holder unclamped from the ram spindle.

The present invention can provide the machine tool which includes the ram spindle and the tool holder having the improved structures, respectively, so that the plurality of inserts is provided in the single tool holder and the locations of the inserts can be rapidly changed by changing whether to fasten the tool holder through the vertical movement of part of the ram spindle, thereby improving productivity and precision and also reducing the costs of products.

DETAILED DESCRIPTION

Figure 1:
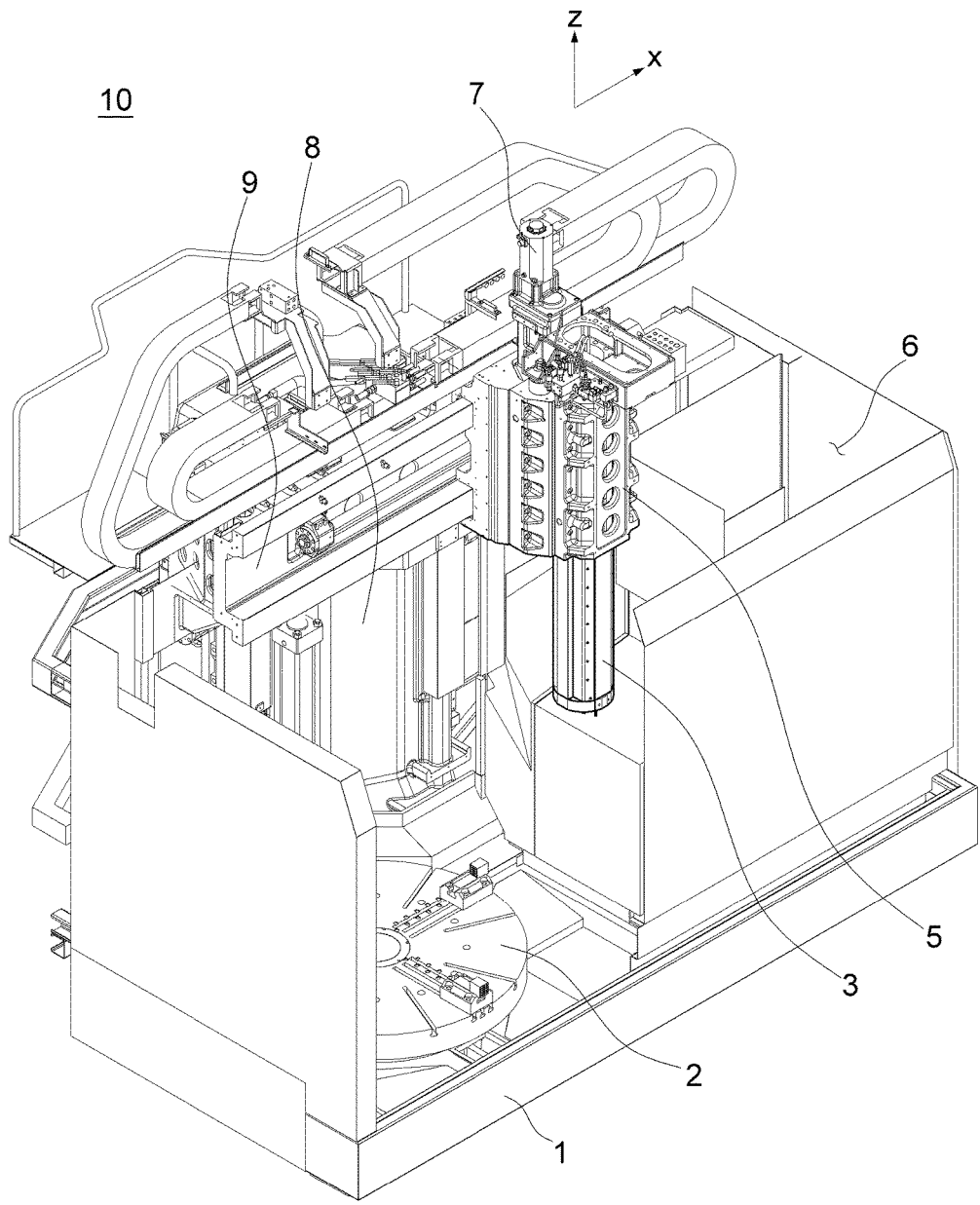
FIG. 1 is a view showing a machine tool in which a conventional ram spindle is disposed.
Figure 2:
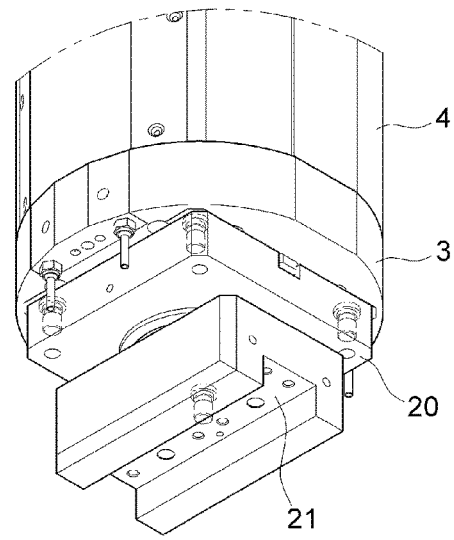
FIG. 2 is a perspective view showing the conventional ram spindle and a conventional tool holder which are coupled to each other.

Preferred embodiments of the present invention will be described in detail below with reference to the accompanying drawings.

Unless specifically defined, all terms used herein have the general meanings that would be understood by those skilled in the art. If the meaning of a term used herein conflicts with the general meaning of the corresponding term, the definition made herein is used.

However, the invention to be described below is intended merely to illustrate an embodiment of the present invention, and is not intended to limit the range of rights of the present invention. Throughout the specification, the same reference numerals designate the same components.

Figure 3:
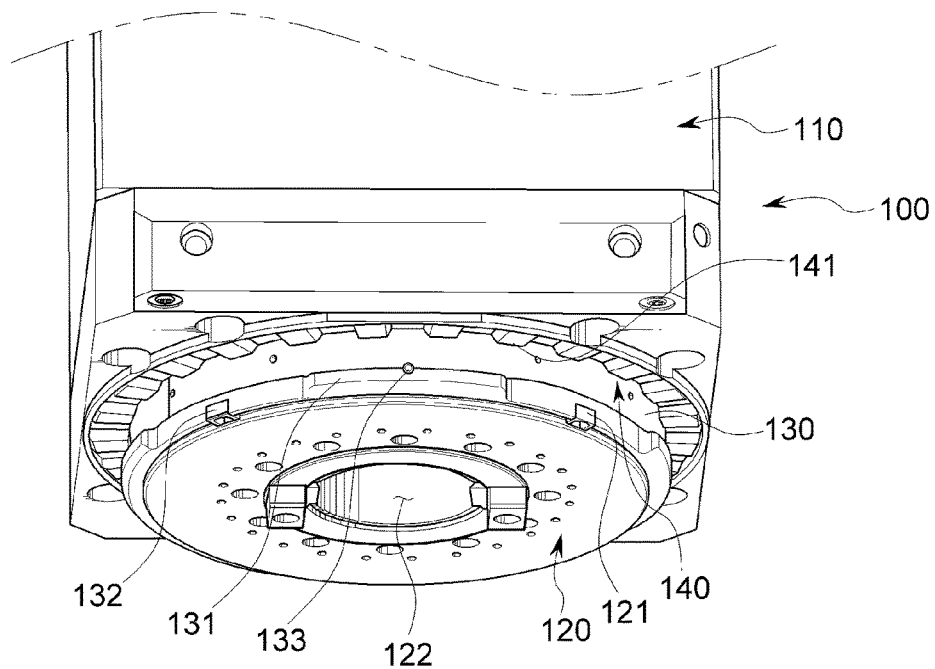
FIG. 3 is a partial perspective view of a ram spindle according to an embodiment of the present invention.
Figure 4:
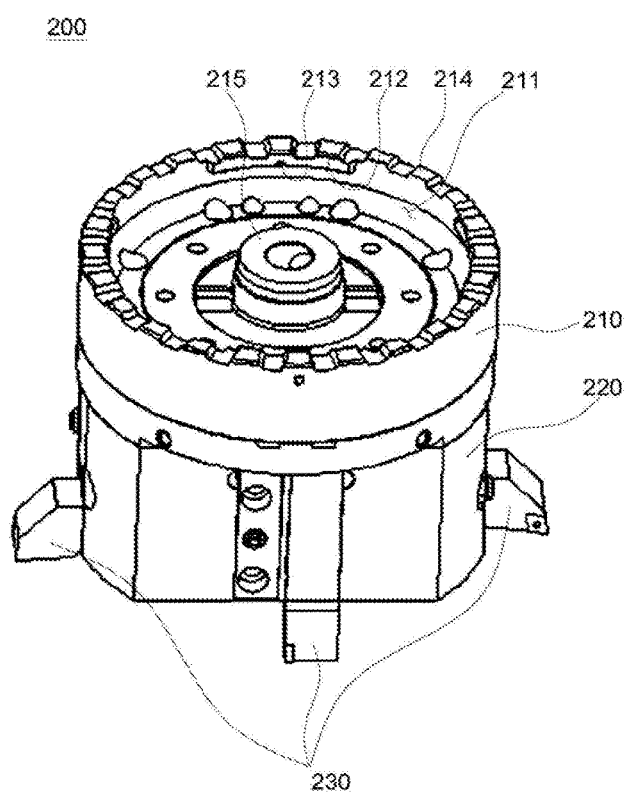
FIG. 4 is a perspective view of a tool holder according to an embodiment of the present invention.
Figure 5A:
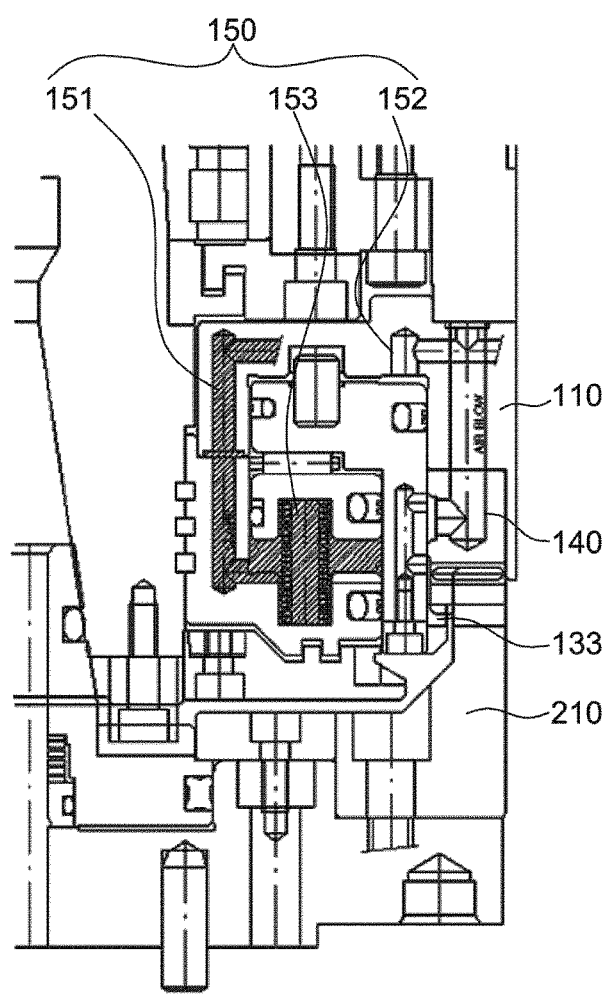
FIG. 5A and FIG. 5B show side sectional views schematically illustrating states in which an actuator unit according to an embodiment of the present invention moves a center part and a first outer part in upward and downward directions.
Figure 5B:
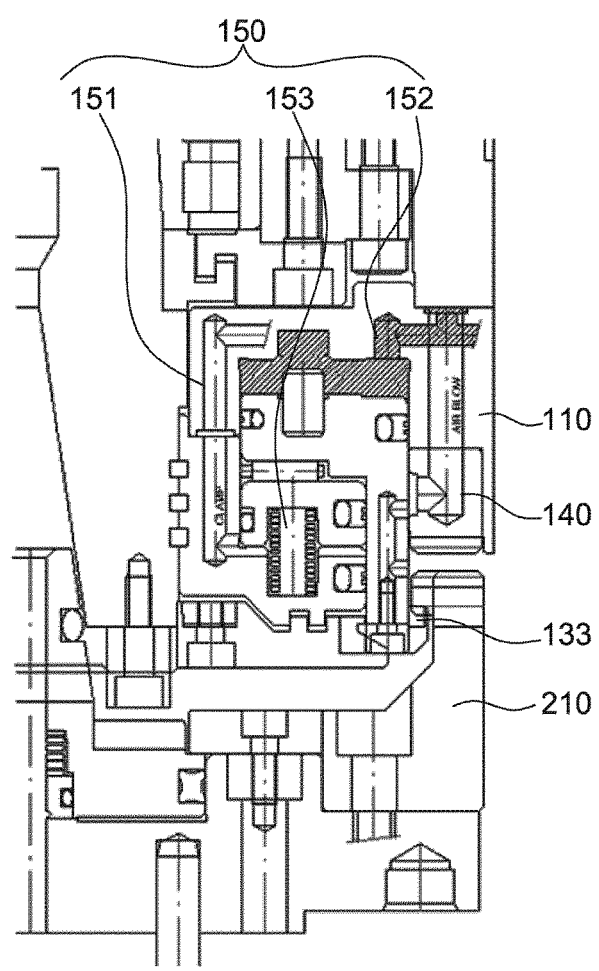

FIG. 3 is a partial perspective view of a ram spindle according to an embodiment of the present invention, FIG. 4 is a perspective view of a tool holder according to an embodiment of the present invention, and FIG. 5A and FIG. 5B show side sectional views schematically illustrating states in which an actuator unit according to an embodiment of the present invention moves a center part and a first outer part in upward and downward directions.

Referring to FIGS. 3 to 5A and 5B, a machine tool according to an embodiment of the present invention provides a ram spindle 100 and a tool holder 200 having improved structures, respectively.

The machine tool according to the present embodiment implements a tool holder configured to include at least two inserts and a ram spindle configured to fasten the tool holder in the state of clamping the tool holder and to rotate the tool holder in order to change the locations of the inserts, thereby rapidly, accurately and stably machining a base material.

More specifically, the ram spindle 100 may include a housing 110, a center part 120, a first outer part 130, a second outer part 140, and an actuator unit 150.

The housing 110 may have an open surface in the lower side surface thereof, and may form the appearance of the ram spindle 100. In this case, the lower side surface is named based on the states shown in the drawings, and may be any one side surface of the housing 110, such as the upper side surface, left side surface, or right side surface thereof, or the like, depending on a viewing direction.

The center part 120 is accommodated inside the housing 110, and is rotatably disposed. The center part 120 may be connected to an externally disposed motor via pulleys, or may be rotated by a directly connected motor disposed inside the housing 110.

Furthermore, at least two protruding keys 121 may be disposed on the outer circumferential surface of the center part 120. These keys 121 may be integrated with the center part 120, or may be coupled to the center part 120 by means of a well-known method, such as bolt coupling.

Furthermore, a guide depression 122 corresponding to a guide protrusion 215 to be described later may be formed in the center part 120. The tool holder 200 may be stably mounted on the ram spindle 100 by the guide depression 122 and the guide protrusion 215.

The first outer part 130 is disposed outside the center part 120, and is co-rotated with the center part 120. Outer ribs 131 protruding at equal intervals may be formed on the outer circumferential surface of the first outer part 130. Although four outer ribs 131 may be formed along the end of the first outer part 130 at equal intervals, as shown in FIG. 3, the configuration of the outer ribs 131 is not limited thereto.

In this case, the first outer part 130 and the center part 120 are components separate from each other, and thus key coupling depressions 132 coupled with the keys 121 may be formed in the first outer part 130 so as to receive rotation force when the center part 120 is rotated.

Furthermore, one or more protrusions 133 formed adjacent to the outer rib 131 may be formed on the first outer part 130. In other words, the protrusions 133 may be formed on the respective four outer ribs 131, or a protrusion 133 may be formed on at least any one of the four outer ribs. Depressions 213 to be described later may be inserted over the protrusions 133, and guide the tool holder 200 to an accurate fastening location with respect to the ram spindle 100.

The second outer part 140 may be disposed between the housing 110 and the first outer part 130, and may be fastened to the housing 110. In other words, the second outer part 140 supports the center part 120 and the first outer part 130, surrounding the outer circumferential surface of the center part 120, inside the housing 110, and is also fastened to the housing 110. Accordingly, the second outer part 140 is not rotated even when the center part 120 and the first outer part 130 are rotated.

Accordingly, a bearing (not shown) may be disposed between the first outer part 130 and the second outer part 140, and may promote the smooth rotation of the first outer part 130 inside the fastened second outer part 140.

Furthermore, a first protrusion and depression part 141 may be formed on the surface of the second outer part 140, opposite to a coupling part 210 to be described later, so as to be engaged with a second protrusion and depression part 214 formed on the coupling part 210.

In other words, when the center part 120 and the first outer part 130 are raised by the actuator unit 150, the tool holder 200 is firmly fastened to the ram spindle 100 through the engagement between the first protrusion and depression part 141 and the second protrusion and depression part 214, thereby enabling a rotating base material to be precisely machined.

The actuator unit 150 may be accommodated inside the housing 110, may selectively move upward and downward through the open surfaces of the center part 120 and the first outer part 130, and may be implemented as a pneumatic or hydraulic cylinder.

Referring to FIG. 5A and FIG. 5B, the actuator unit 150 includes a clamping passage 151 and an unclamping passage 152, and may further include a spring 153 configured to provide restoring force.

More specifically, the actuator unit 150 may be disposed inside the center part 120 or first outer part 130. As shown in FIG. 5A, a hydraulic or pneumatic medium enters into the clamping passage 151, and raises the lower end of the center part 120. This raising force may also raise the first outer part 130 coupled through the engagement between the keys 121 and the key depressions.

In contrast, as shown in FIG. 5B, a hydraulic or pneumatic medium enters into the unclamping passage 152, and lowers the lower end of the center part 120. This lowering force may also lower the first outer part 130 coupled through the engagement between the keys 121 and the key depressions.

Furthermore, since the tool holder 200 needs to be firmly clamped to the ram spindle 100 in order to machine a base material, the spring 153 is preferably disposed to provide restoring force during a shift from an unclamping state to a clamping state.

Meanwhile, the tool holder 200 may be divided into the coupling part 210 and a mounting part 220, and the coupling part 210 and the mounting part 220 may be integrated with each other or disposed in a coupled form by using a bolting method.

The ram spindle 100 is mounted at one end of the coupling part 210, and the mounting part 220 to be described later is disposed at the other end thereof.

More specifically, a cavity 211 may be formed at one end, i.e., upper side surface, of the coupling part 210, and inner ribs 212 protruding to come into contact with the inner diameter of the first outer part 130 or to be spaced apart at predetermined intervals may be formed on the inner circumferential surface of the cavity 211 at equal intervals.

In this case, the thickness of the upper end defined by the cavity 211 of the coupling part 210, i.e., the length defined by the inner and outer circumferential surfaces of one end of the coupling part 210, may be formed to be equal to or smaller than that of the second outer part 140.

However, when the coupling between the outer ribs 131 and the inner ribs 212 is taken into account, it is preferred that the outer diameter of the one end of the coupling part 210 is formed to be equal to that of the second outer part 140 and the inner diameter of the one end of the coupling part 210 is formed to be larger than that of the second outer part 140.

Furthermore, depressions 213 formed adjacent to the inner ribs 212 and configured to be seated over the protrusions 133 may be formed in the coupling part 210 so as to correspond in number to the protrusions 133.

In other words, the inner ribs 212 are made to be disposed at locations where the outer ribs 131 are not formed. When the tool holder 200 is raised and rotated in a clockwise or counterclockwise direction, the depressions 213 and the protrusions 133 are engaged with each other, and thus the accurate disposition location of the tool holder 200 can be determined.

Furthermore, as described above, the second protrusion and depression part 214 is formed on the upper side surface of the coupling part 210. When the center part 120 and the first outer part 130 are raised by the actuator unit 150, the first protrusion and depression part 141 and the second protrusion and depression part 214 are engaged with each other, which enables the tool holder 200 to be firmly mounted on the ram spindle 100.

Furthermore, a guide protrusion 215 formed to protrude is formed at the center of the cavity 211, and is engaged with the guide depression 122 of the center part 120. Stable coupling is achieved by the guide depression 122 and the guide protrusion 215.

At least two inserts 230 may be coupled to the other side, i.e., free end, of the mounting part 220 other than one side of the mounting part 220 coupled to the coupling part 210. Although a total of four heterogeneous inserts 230 are disposed along an overall region including the opposite side not shown in the drawing, the configuration of the inserts 230 is not limited thereto.

The tool holder 200 according to the present embodiment may be unclamped from the ram spindle 100, and may be stored in an auto tool changer (ATC) accommodated inside the ATC accommodation part 6 (see FIG. 1).

In summary, the present invention may be operated as follows. Once a base material is rotated by the turntable 2 (see FIG. 1), an unclamping state in which the tool holder 200 is mounted on but not firmly fastened to the ram spindle 100, as shown in FIG. 5B, is entered in order to bring a programmed insert 230 into contact with the base material.

Thereafter, the center part 120 is rotated to dispose the insert 230 suitable for an operation in the direction of the base material, and also the first outer part 130 is co-rotated by the center part 120. The tool holder 200 may be also co-rotated by the rotation of the first outer part 130.

When the desired insert 230 is disposed in the direction of the base material, a clamping state is entered, as in the state of FIG. 5A, and thus the first protrusion and depression part 141 and the second protrusion and depression part 214 are firmly engaged with each other, with the result that the tool holder according to the present embodiment is fastened to the ram spindle, thereby enabling a precise turning operation to be performed.

From the foregoing description, it will be apparent to those skilled in the art that various alterations and modifications may be made without departing from the technical spirit of the present invention. The technical scope of the present invention is not limited to the details described in conjunction with the embodiments, but should be defined by the claims and the ranges equivalent to the claims.

The invention claimed is:
1. A machine tool, the machine tool comprising:
a tool holder configured to include at least two machining inserts; and
a ram spindle configured to fasten the tool holder in a state of clamping the tool holder and to rotate the tool holder in order to change locations of the machining inserts;

wherein the ram spindle comprises:
- a housing;
- a center part rotatably accommodated inside the housing;
- a first outer part disposed outside the center part, and configured to be co-rotated with the center part;
- a second outer part disposed between the housing and the first outer part and fastened to the housing; and
- an actuator unit accommodated inside the housing, and configured to selectively move the center part and the first outer part upward and downward;

wherein outer ribs protruding at equal intervals are formed on an outer circumferential surface of the first outer part, and protruding inner ribs spaced apart at predetermined intervals are formed on an inner circumferential surface of a cavity of the tool holder at equal intervals;

wherein a respective protrusion is formed on each of the outer ribs, and wherein a corresponding respective depression is provided on the tool holder adjacent to each of the inner ribs, each of the depressions being configured to be seated over a respective one of the protrusions.

2. The machine tool of claim 1, wherein the housing is configured to have an opening in a lower side surface thereof.

3. The machine tool of claim 1, wherein the tool holder comprises:
- a coupling part configured such that one end thereof is mounted on the ram spindle; and
- a mounting part disposed on an end of the coupling part opposite to the one end, the at least two machining inserts being coupled to a free end of the mounting part.

4. The machine tool of claim 3, wherein the cavity is formed in the one end of the coupling part, and the inner ribs are formed on an inner circumferential surface of the cavity at equal intervals.

5. The machine tool of claim 4, wherein an outer diameter of said one end of the coupling part, which one end is defined by the cavity, is formed to be equal to that of the second outer part, and an inner diameter of the one end of the coupling part is formed to be equal to or larger than that of the second outer part.

6. The machine tool of claim 3, wherein:
the depressions configured to be seated over the protrusions are formed in the coupling part.

7. The machine tool of claim 6, wherein:
the depressions guide the tool holder with respect to the ram spindle to a fastening location.

8. The machine tool of claim 3, wherein a first protrusion and depression part and a second protrusion and depression part configured to be engaged with each other are formed on opposite surfaces of the second outer part and the coupling part, respectively, and are engaged with each other when the center part and the first outer part are raised by the actuator unit.

9. The machine tool of claim 3, wherein the inner ribs come into contact with an outer diameter of the first outer part.

10. The machine tool of claim 1, wherein:
at least two protruding keys are disposed on an outer circumferential surface of the center part; and
key coupling depressions configured to be engaged with the keys are formed on the first outer part.

11. The machine tool of claim 1, wherein:
a guide protrusion formed to protrude is disposed at a center of the cavity; and
a guide depression corresponding to the guide protrusion is formed in the center part.

12. The machine tool of claim 1, wherein the actuator unit is disposed inside the center part or the first outer part.

13. The machine tool of claim 1, wherein the actuator unit comprises:
a clamping passage configured such that an actuation medium passing therethrough serves to raise the center part;
an unclamping passage spaced apart from the clamping passage, and configured such that an actuation medium pasting therethrough serves to lower the center part; and
a spring configured to provide force in a direction in which the center part is raised.

14. The machine tool of claim 1, further comprising an auto tool changer (ATC) configured to store the tool holder unclamped from the ram spindle.

* * * * *